United States Patent
Yang (10) Patent No.: US 8,760,584 B2
(45) Date of Patent: Jun. 24, 2014

(54) MEMORY SPACE CONFIGURATION METHOD APPLIED IN VIDEO SIGNAL PROCESSING APPARATUS

(71) Applicant: MStar Semiconductor, Inc., Hsinchu Hsien (TW)

(72) Inventor: Po-Jen Yang, Hsinchu Hsien (TW)

(73) Assignee: MSTAR Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 13/893,504

(22) Filed: May 14, 2013

(65) Prior Publication Data

US 2014/0111695 A1    Apr. 24, 2014

(30) Foreign Application Priority Data

Oct. 24, 2012 (TW) ............................. 101139243 A (51) Int. Cl.
*H04N 9/64* (2006.01)
*H04N 5/91* (2006.01)

(52) U.S. Cl.
CPC ....................................... *H04N 5/91* (2013.01)
USPC ........... 348/714; 348/715; 348/716; 348/717; 348/718; 348/719; 348/720; 348/721; 348/728; 348/706; 348/501; 348/515; 348/516; 348/522; 348/523; 348/524; 348/552; 348/558; 348/564; 348/565; 348/566; 348/567; 348/569; 348/570; 348/571; 348/274; 348/363; 348/367; 348/443; 348/462; 117/100; 117/101; 117/102; 117/104; 117/105; 117/112

(58) Field of Classification Search
USPC ......... 348/714, 367, 563, 552, 565, 558, 363, 348/706, 728, 715, 716, 717, 718, 719, 720, 348/721, 501, 515, 516, 522, 523, 524, 564, 348/566, 567, 569, 570, 571, 274, 443, 348/462; 117/100, 101, 102, 104, 105, 112, 117/706

See application file for complete search history.

(56) References Cited

U.S. PATENT DOCUMENTS

| | | | | |
|---|---|---|---|---|
| 5,598,275 | A | * | 1/1997 | Nagasawa et al. ............. 386/224 |
| 5,926,228 | A | * | 7/1999 | Jeon et al. ...................... 348/554 |
| 6,016,547 | A | * | 1/2000 | Ono ................................. 713/300 |
| 6,366,309 | B1 | * | 4/2002 | Siegle .............................. 348/21 |
| 6,985,189 | B1 | * | 1/2006 | Takada et al. ................. 348/558 |
| 7,209,179 | B2 | * | 4/2007 | Dai et al. ....................... 348/552 |
| 7,417,689 | B2 | * | 8/2008 | Choi .............................. 348/569 |
| 2003/0177890 | A1 | * | 9/2003 | Furukawa ....................... 84/610 |
| 2009/0222832 | A1 | * | 9/2009 | Sultenfuss .................... 718/104 |
| 2010/0021006 | A1 | * | 1/2010 | Kim et al. ..................... 382/103 |
| 2012/0293607 | A1 | * | 11/2012 | Bhogal et al. ................... 348/36 |

* cited by examiner

*Primary Examiner* — Jefferey Harold
*Assistant Examiner* — Mustafizur Rahman
(74) *Attorney, Agent, or Firm* — WPAT, PC; Justin King (57) ABSTRACT

A memory space configuration method applied in a video signal processing apparatus is provided. The method includes: arranging a first memory space and a second memory space in a memory, the first and second memory spaces being partially overlapped; determining a type of a signal source; when the signal source is a first video signal source, enabling a first processing circuit and buffering data associated with the first video signal source by using the first memory space; and, when the signal source is a second video signal source, enabling a second processing circuit and buffering data associated with the second video signal source by using the second memory space. The second processing circuit is disabled when the first processing circuit is enabled; the first processing circuit is disabled when the second processing circuit is enabled.

12 Claims, 6 Drawing Sheets

MEMORY SPACE CONFIGURATION METHOD APPLIED IN VIDEO SIGNAL PROCESSING APPARATUS

This application claims the benefit of Taiwan application Serial No. 101139243, filed Oct. 24, 2012, the subject matter of which is incorporated herein by reference.

BACKGROUND OF THE INVENTION

1. Field of the Invention

The invention relates in general to a video signal processing mechanism, and more particularly to a memory space configuration method applied in a video signal processing apparatus.

2. Description of the Related Art

In a conventional television signal processing apparatus, regardless of the type of received images, a corresponding memory space in an internal memory unit needs to be first arranged for the use of multiple hardware processing circuits. For example, an image source may be different types of signal sources such as an analog television signal source, a digital television signal source, and a multimedia signal source. In a conventional television processing circuit, an analog television processing circuit, a digital television processing circuit, and a multimedia processing circuit are correspondingly designed by a technical staff for handling the different signal sources. In a conventional architecture, all signal processing circuits (including the analog television processing circuit, the digital television processing circuit, and the multimedia processing circuit) start operating after the television signal processing apparatus is powered on, and hardware components such as the signal processing circuits correspondingly access the prearranged memory space. When a current signal source is switched to another signal source (e.g., due to a user deciding to watch another type of image frames), all of the signal processing circuits still continue to operate. In other words, in the conventional architecture, even when a particular signal source is not currently processed (e.g., a digital television signal source is not processed if an analog television signal source is currently being processed), a digital television processing circuit corresponding to the digital television source is still enabled and is correspondingly designated with a memory space. From a perspective of the analog television processing circuit for processing the analog television signal source, the memory space designated to the digital television processing circuit at this point is not released, meaning that the memory space is inaccessible by the analog television processing circuit. Thus, an actual memory space configuration method of the conventional television signal processing apparatus lacks efficiency and can only be implemented through memory elements in larger sizes, leading to increased production costs. Further, all hardware circuit elements for processing different signal sources at the same time are enabled, further resulting in power consumption issues and power-saving deficiencies.

SUMMARY OF THE INVENTION

The invention is directed to a video signal processing apparatus, and more particular to a memory space configuration method applied in a video signal processing apparatus for solving the above issues in the prior art.

According to an embodiment of the present invention, a memory space configuration method applied in a video signal processing apparatus is provided. The method includes: arranging a first memory space and a second memory space in a memory, the first and second memory spaces being partially overlapped; determining a type of a signal source; when the signal source is a first video signal source, enabling a first processing circuit and buffering data associated with the first video signal source by using the first memory space; and, when the signal source is a second video signal source, enabling a second processing circuit and buffering data associated with the second video signal source by using the second memory space. The second processing circuit is disabled when the first processing circuit is enabled; the first processing circuit is disabled when the second processing circuit is enabled.

According to an alternative embodiment, a video signal processing apparatus is provided. The apparatus includes: a memory, arranged with a first memory space and a second memory space in a memory, the first and second memory spaces being partially overlapped; a detection unit, for determining a type of a signal source; a first processing circuit, for processing a first video signal source; a second processing circuit, for processing a second video signal source; and a processor, for controlling the first processing circuit and the second processing circuit according to the type of the video signal source, enabling the first processing circuit to process the first video signal source by using the first memory space when the signal source is the first video signal source, and enabling the second processing circuit to process the second video signal source by using the second memory space when the signal source is the second video signal source.

According to the embodiments of the present invention, the memory space configuration and operations adopted for different types of signal sources allow different signal sources executed to respectively utilize a same block space at different time points. Therefore, an overall utilization amount of the memory space is reduced to more efficiently utilize more memory spaces and to lower production costs. Further, for different signal sources received, instead of enabling all hardware circuit elements, the embodiments of the present invention enable only corresponding hardware circuit elements at the same time achieve a power-saving effect.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
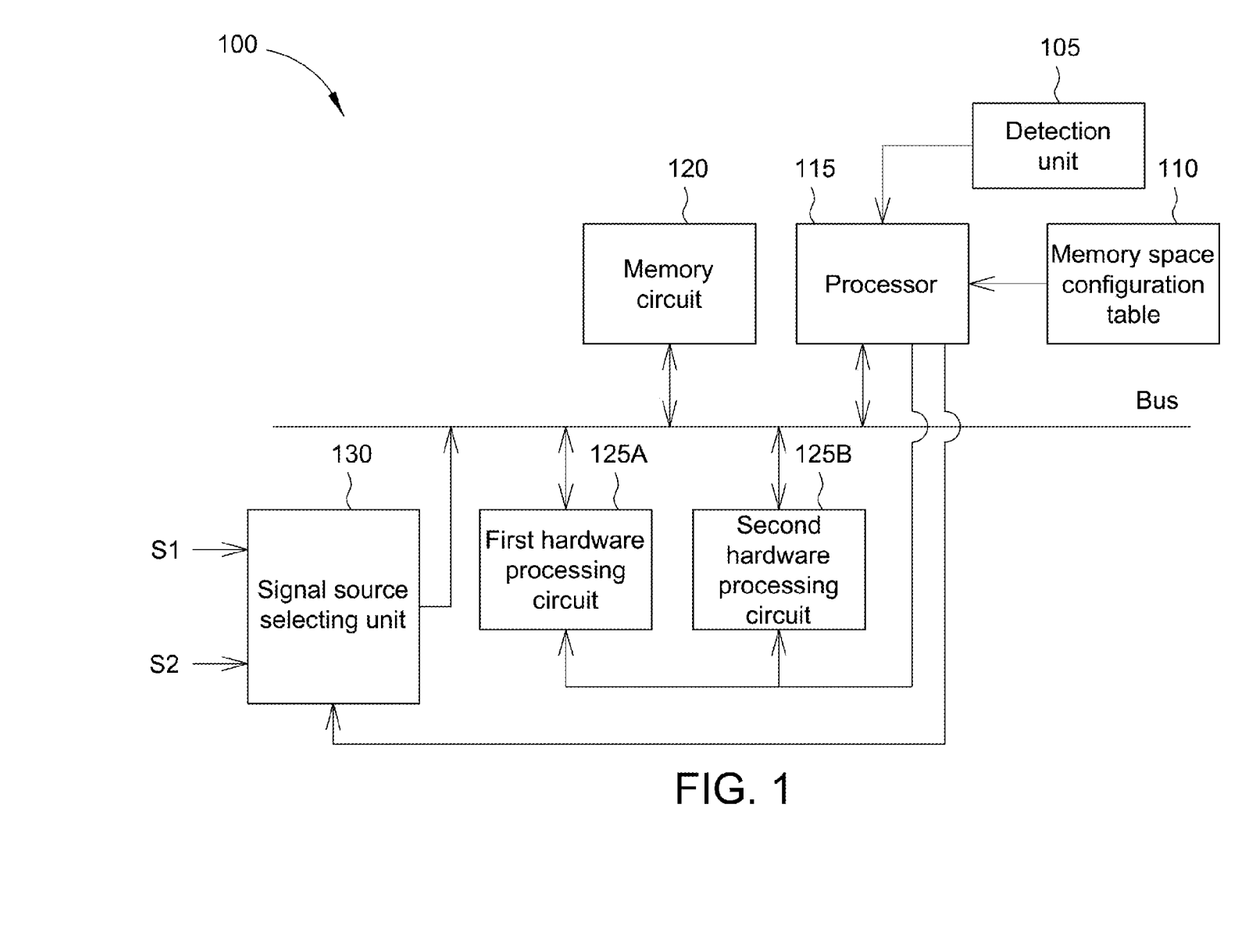
FIG. 1 is a schematic diagram of a video signal processing apparatus according to a first embodiment of the present invention.

FIG. 1 shows a schematic diagram of a video signal processing apparatus 100 according to an embodiment of the present invention. The video signal processing apparatus 100 includes a detection unit 105, a memory space configuration table 110, a processor 115, a memory circuit 120, a plurality of hardware processing circuits 125A and 125B, and a signal source selecting unit 130. The first hardware processing circuit 125A processes a first signal source S1, and the second hardware processing circuit 125B processes a second signal source S2. The first signal source S1 and the second signal source S2 are different types of signal sources. The memory space configuration table 110 is used to record the configuration result of the memory circuit 120. The video signal processing apparatus 100 receives and processes various kinds of signal source, such as the first signal source S1 and the second signal source S2, according to user command. For example, the first signal source S1 is one of an analog television signal source, a digital television signal source, and a multimedia signal source, and the second signal source S2 is another of the analog television signal source, the digital television signal source, and the multimedia signal source. The video signal processing apparatus 100 can output and display frame data of a processed signal source on a display monitor. Regarding reception and processing of a signal source, the detection unit 105 detects a command entered by a user, and transmits an obtained detection result to the processor 115. The processor 115 activates a corresponding code according to the detection result to perform an operation corresponding to the signal source. For example, if the detection result generated by the detection unit 105 indicates that the user wishes to view images of the first signal source S1 (e.g., an analog television signal source), the processor 115 activates and executes an associated code for processing the analog television signal source according to the detection result. When executing the corresponding code, the processor 115 further arranges memory spaces in the memory circuit 120 according to a configuration method instructed by the memory space configuration table 110. Thus, when the first hardware processing circuit 125A processes the first signal source S1 (e.g., an analog television signal source), associated data may be buffered in or accessed from the designated memory space (at least including the first memory space) in the memory circuit 120 by using the designated memory space in the memory circuit 120. In practice, when the first signal source S1 is an analog television signal source, the first hardware processing circuit 125A may comprise a comb filter, e.g., a 3D comb filter. The comb filter is for separating luminance and color signals from the analog television signal source, such that the luminance and color signals can be transmitted to corresponding demodulators without interfering each other. However, it should be noted that, instead of being a comb filter, in an alternative embodiment, circuit designs of the first hardware processing circuit 125A can be determined according to the type of the first signal source S1 in actual applications.

Similarly, when the detection result generated by the detection unit 105 indicates that the user wishes to view images of the second signal source S2 (e.g., one of a digital television signal source and a multimedia signal source), the processor 115 activates and executes an associated code for processing the second signal source S2. When executing the corresponding code, the processor 115 further arranges memory spaces in the memory circuit 120 according to the configuration method instructed by the memory space configuration table 110. Thus, when the second hardware processing circuit 125B processes the second signal source S2 (e.g., one of the television signal source and the multimedia signal source), associated data may be buffered in or accessed from the designated memory space (at least including the second memory space) in the memory circuit 120 by using the designated memory space in the memory circuit 120. In practice, when the second signal source S2 is a digital television signal source, the second hardware processing circuit 125B may be a hardware processing circuit for an electronic program guide (EPG), and is for processing and retrieving data and images of an EPG in the digital television signal source. Further, when the second signal source S2 is a multimedia signal source, in practice, the second hardware processing circuit 125B may be a hardware processing circuit for multimedia signals, and is for retrieving and processing associated data and images in the multimedia signal source. It should be noted that, in the present invention, in addition to a hardware processing circuit for processing a digital television signal source or a multimedia signal source, in an alternative embodiment, circuit designs of the second hardware processing circuit 125B may be determined according to the type of the second signal source S2 in actual applications.

Figure 2A:
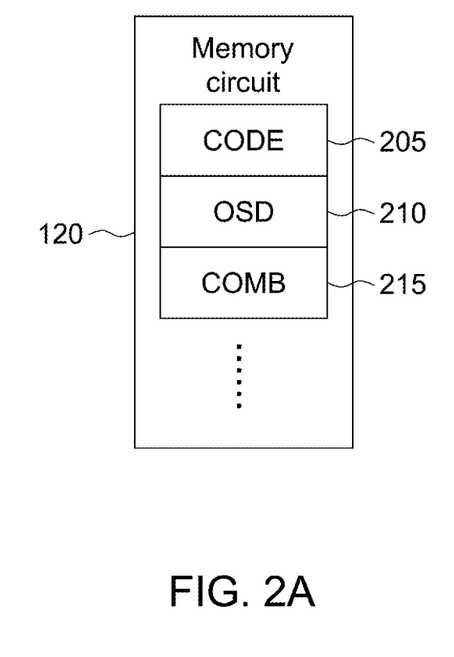
FIGS. 2A and 2B are respectively schematic diagrams of a memory space configuration of a memory circuit that the memory space configuration table in FIG. 1 designates for a first signal source S1 and a second signal source S2.
Figure 2B:
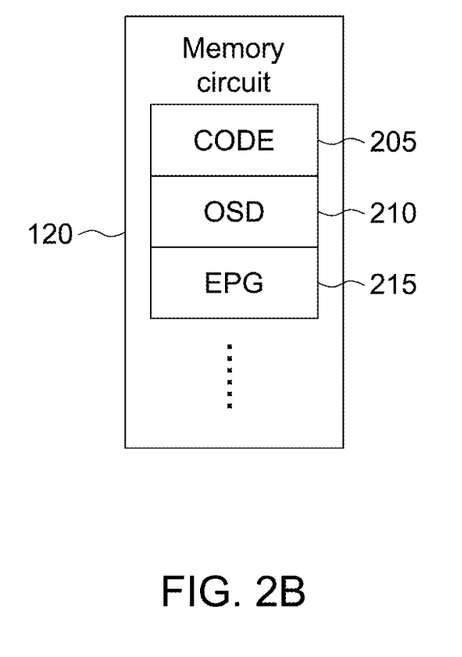

As previously described, when processing corresponding signal sources in the embodiment of the present invention, for different types of signal sources S1 and S2, the hardware processing circuit 125A or 125B respectively buffer associated data in the designated memory spaces or access associated data from the designated memory spaces of the memory circuit 120. In the embodiment of the present invention, in order to save the memory space of the memory circuit 120, contents of the memory space configuration table 110 indicate the first memory space accessed by the first hardware processing circuit 125A and the second memory space accessed by the second hardware processing circuit 125B, with the first and second memory spaces being partially overlapped. In a preferred embodiment, the first and second memory spaces are overlapped, i.e., the hardware processing circuits 125A and 125B in fact access the same memory space. FIG. 2A shows a schematic diagram of a memory space configuration of the memory circuit 120 that the memory space configuration table 110 designates for the first signal source S1. FIG. 2B shows a schematic diagram of a memory space configuration of the memory circuit 120 that the memory space configuration table 110 designates for the second signal source S2. Referring to FIGS. 2A and 2B, addresses of the memory spaces 205 and 210 are arranged for storing a processor code "CODE" and on-screen display (OSD) data "OSD" constantly used when processing the first signal source S1 and the second signal source S2. When the video signal processing apparatus 100 processes the first signal source S1 (as shown in FIG. 2A), addresses of the memory space 215 are for storing data associated with the first signal source S1. In other words, the memory space 215 is the above first memory space, and, when the first signal source S1 is an analog television signal source, for example, the addresses of the memory space 215 are for storing signal data "COMB" for separating luminance and color signals from the analog television signal source. In contrast, when the video signal processing apparatus 100 is for processing the second signal source S2 (as shown in FIG. 2B), the addresses of the memory space 215 are for storing associated data for processing the second signal source S2. In other words, the memory space 215 is also the above second memory space, and the addresses of the memory space 215 may store the data and images "EPG" of the EPG of the digital video signal source. Further, when the second signal source S2 is a multimedia signal source, the addresses of the memory space 215 may store the multimedia data and images of the multimedia signal source. Thus, the same starting address is configured as the starting addresses of the first and second memory spaces, and the same ending address is configured as the ending addresses of the first and second memory spaces respectively accessible by the first and second hardware processing circuits 125A and 125B. Thus, by utilizing the same memory space 215 for storing different data (e.g., the data "COMB" and "EPG") of the different signal sources S1 and S2 processed at different time points, a smaller memory space may be implemented in circuit designs of the memory circuit 120. In other words, the size of the memory circuit 120 may be relatively reduced for lowered production costs.

Figure 3A:
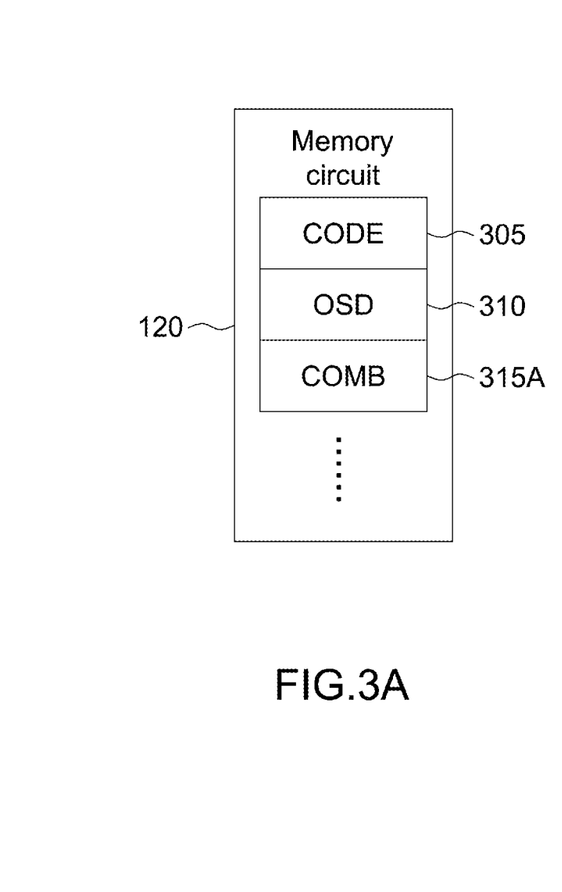
FIGS. 3A and 3B are respectively schematic diagrams of another memory space configuration of a memory circuit that the memory space configuration table in FIG. 1 designates for a first signal source S1 and a second signal source S2.
Figure 3B:
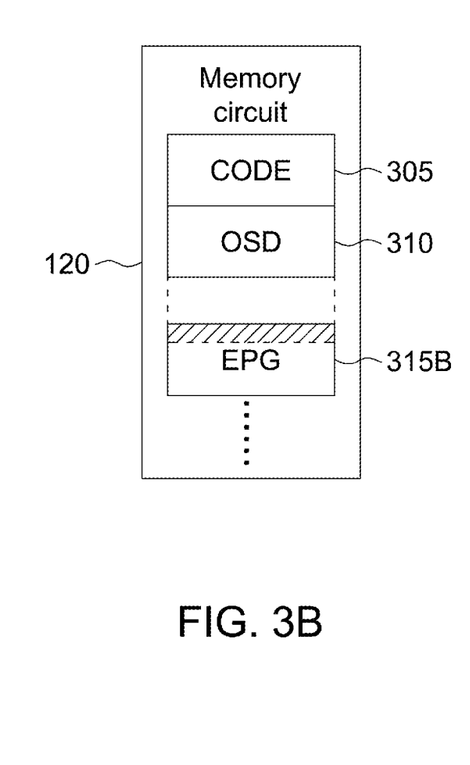

It should be noted that, the above design of the overlapping addresses of the first and second memory spaces is merely an example in an embodiment for explaining the present invention. In an alternative embodiment, a part of the addresses of the first memory space may be designed to overlap a part of the addresses of the second memory space. That is, the addresses of the first and second memory spaces are partially overlapped. FIG. 3A shows a schematic diagram of a memory space configuration of the memory circuit 120 that the memory space configuration table 110 designates for the first signal source S1. FIG. 3B shows a schematic diagram of a memory space configuration of the memory circuit 120 that the memory space configuration table 110 designates for the second signal source S2. Referring to FIGS. 3A and 3B, addresses of memory spaces 305 and 310 are for storing a processor code "CODE" and OSD data "OSD" constantly used when processing the first signal source S1 and the second signal source S2. When the video signal processing apparatus 100 processes the first signal source S1 (as shown in FIG. 3A), addresses of a memory space 315A are for storing associated data for processing the first signal source S1, e.g., data "COMB" of a comb filter. In contrast, when the video signal processing apparatus 100 is for processing the second signal source S2 (as shown in FIG. 3B), the addresses of the memory space 315B are for storing associated data for processing the second signal source S2, e.g., EPG data "EPG", with the addresses of the memory space 315A are only partially overlapped (as indicated by a non-shaped area in the FIG. 3A) with the addresses of the memory space 315B. It should be noted that, the memory spaces 315A and 315B are an example of partially overlapped addresses in an embodiment of the present invention. In other embodiments, variations can be made to the partially overlapped addresses. In an embodiment, a starting address of a memory space may be designed to locate between a starting address and an ending address of another memory space. For example, in FIGS. 3A and 3B, the starting address of the second memory space 315B is configured between the starting address and the ending address of the first memory space 315A. It should be noted that similar modifications and variations are all encompassed with the spirit of the present invention.

Figure 4:
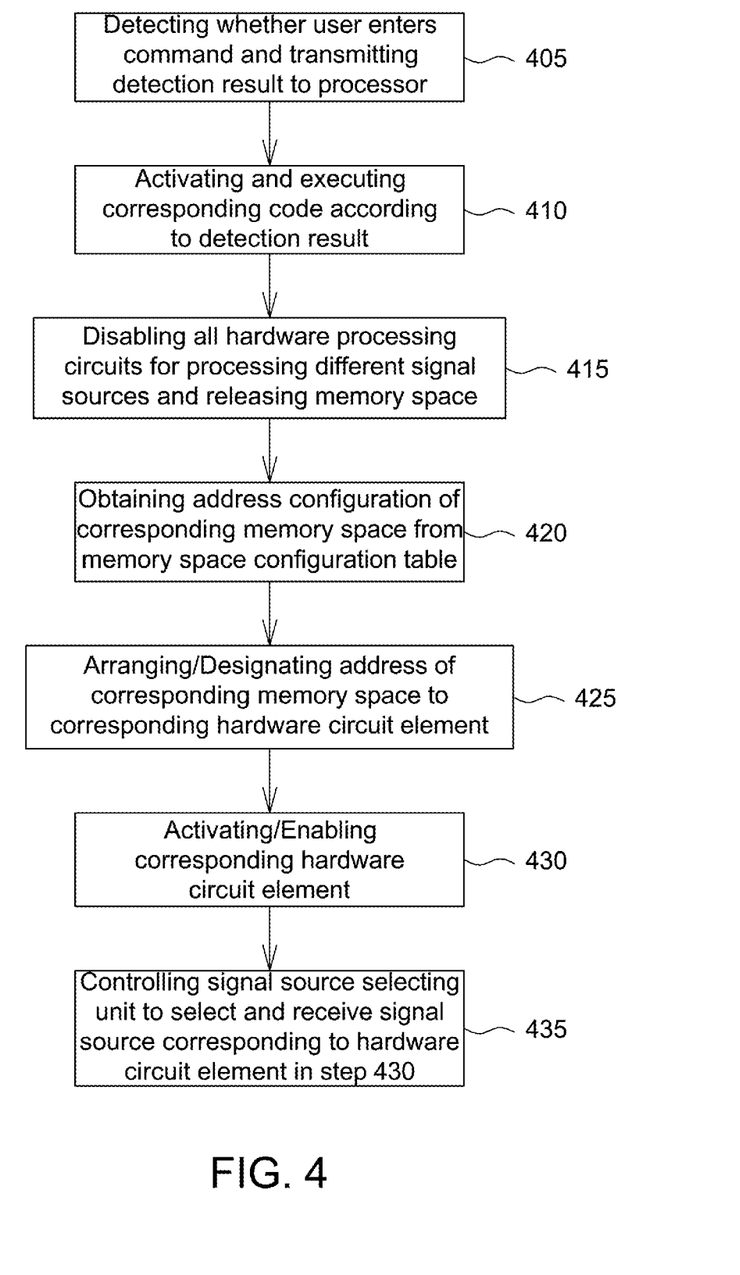
FIG. 4 is a flowchart of an operation process of the video signal processing apparatus in FIG. 1.

Further, in order to utilize addresses of a same memory space or at least partially the same addresses of a memory space when respectively processing the signal source S1 and the second signal source S2, in an embodiment of the present invention, only one corresponding hardware processing circuit is enabled when processing one signal source. That is to say, only the first hardware processing circuit 125A is enabled when processing the first signal source S1 while other hardware circuits (i.e., the second hardware processing circuit 125B) is disabled, and only the second hardware processing circuit 125B is enabled when processing the second signal source S2 while other hardware processing circuits (i.e., the first hardware processing circuit 125A) is disabled. When the first hardware processing circuit 125A is enabled and the second hardware processing circuit 125B is disabled, it means that the memory space previously occupied by the second hardware processing circuit 125B is released. The released memory space can be designated for the first hardware processing circuit 125A for processing operations of the first signal source S1. In contrast, when the second hardware processing circuit 125B is enabled and the first hardware processing circuit 125A is disabled, it means that the memory space previously occupied by the first hardware processing circuit 125A is released. The release memory space can be designated for the second hardware processing circuit 125B for processing operations of the second signal source S2. Therefore, processing operations of the different signal sources S1 and S2 by using the addresses of the same memory space or at least partially the same addresses in memory spaces do not lead to any errors. FIG. 4 shows a flowchart of an operation process of the video signal processing apparatus 100 in FIG. 1. Given that substantially the same results are obtained, the operation process is not necessarily performed according to the order of the steps in FIG. 4. Further, the steps in FIG. 4 need not be consecutively performed; that is, the steps in FIG. 4 may be interleaved with other steps.

In step 405, when the video signal processing apparatus 100 is powered on, the detection unit 105 detects whether a user enters a command. When the user command is detected, an obtained detection result is output and transmitted to the processor 115. In step 410, the processor 115 receives the detection result, and activates and executes a corresponding code according to the detection result. In step 415, the corresponding code first disables all hardware processing circuits for processing different signal sources when being executed, and releases a memory space of the memory circuit 120. For example, the corresponding code disables the first hardware processing circuit 125A and the second hardware processing circuit 125B in FIG. 1. In step 420, the processor 115 executes the corresponding code, and obtains an address configuration of a corresponding memory space from the memory space configuration table 110 according to the detection result of the detection unit 105. In step 425, the processor 115 arranges/designates the addresses of the corresponding memory space to a corresponding hardware circuit element. More specifically, the processor 115 arranges/designates the address configuration of the memory space to the first hardware processing circuit 125A when the detection result of the detection unit 105 indicates the first signal source S1, or else the processor 115 arranges/designates the address configuration of the memory space to the second hardware processing circuit 125B when the detection result of the detection unit 105 indicates the second signal source S2. In step 430, the processor 115 activates/enables a corresponding hardware circuit element in step 425. In step 435, the processor 115 controls the signal source selecting unit 130 to select and receive a signal source corresponding to the hardware circuit element in step 430, and the hardware circuit element activated/enabled in step 430 then starts processing the signal received from the signal source selecting unit 130.

For example, when the detection result detected by the detection unit 105 indicates the first signal source S1, it means that the user wishes to view images of the first signal source S1. Thus, in step 410, the processor 115 selects and executes the corresponding code. To prevent simultaneously activating two hardware processing circuit elements in subsequent operations, the corresponding code first disables both of the hardware processing circuits 125A and 125B in step 415, and releases the memory space of the memory circuit 120. The code arranges the physical addresses according to the contents of the memory space configuration table in steps 420 and 425, and later activates the first hardware processing circuit 125A corresponding to the first signal source S1 in step 430. Thus, the process according to the embodiment of the present invention ensure that only one hardware processing circuit element (i.e., the first hardware processing circuit 125A) is activated/enabled at the same time point, and the arranged memory space is designated to the activated/enabled hardware processing circuit element 125A. Therefore, operations performed by the video signal processing apparatus 100 of sharing a part or all of the physical addresses of the same memory space for saving the memory space is free of access errors. In contrast, when the detection result indicates the second signal source S2, similarly only the second hardware processing circuit 125B corresponding to the second signal source S2 is activated/enabled in step 430, thereby ensuring that only the second hardware processing circuit 125B is activated/enabled at the same time point.

Once the user decides to view images of the second signal source S2 and accordingly enters a command for instructing switching from the first signal source S1 to the second signal source S2, the detection unit 105 detects the command in step 405 and outputs a detection result to the processor 115. The processor selects and executes a code corresponding to the second signal source S2 in step 410, and disables both of the hardware processing circuits 125A and 125B and releases the memory space of the memory circuit 120 in step 415, i.e., releasing the memory space previously designated to and utilized by the first hardware processing circuit 125A. In the subsequent steps 420 and 425, the code corresponding to the second signal source S2 arranges the physical addresses according to the contents of the memory space configuration table. In step 430, the code corresponding to the second signal source S2 again enables the second hardware processing circuit 125B corresponding to the second signal source S2. In other words, when the video signal processing apparatus 100 is powered on or when a user wishes to switch to a different signal source, the process in FIG. 4 is sequentially performed to arrange physical addresses of a corresponding memory space to an enabled hardware processing circuit.

Figure 5:
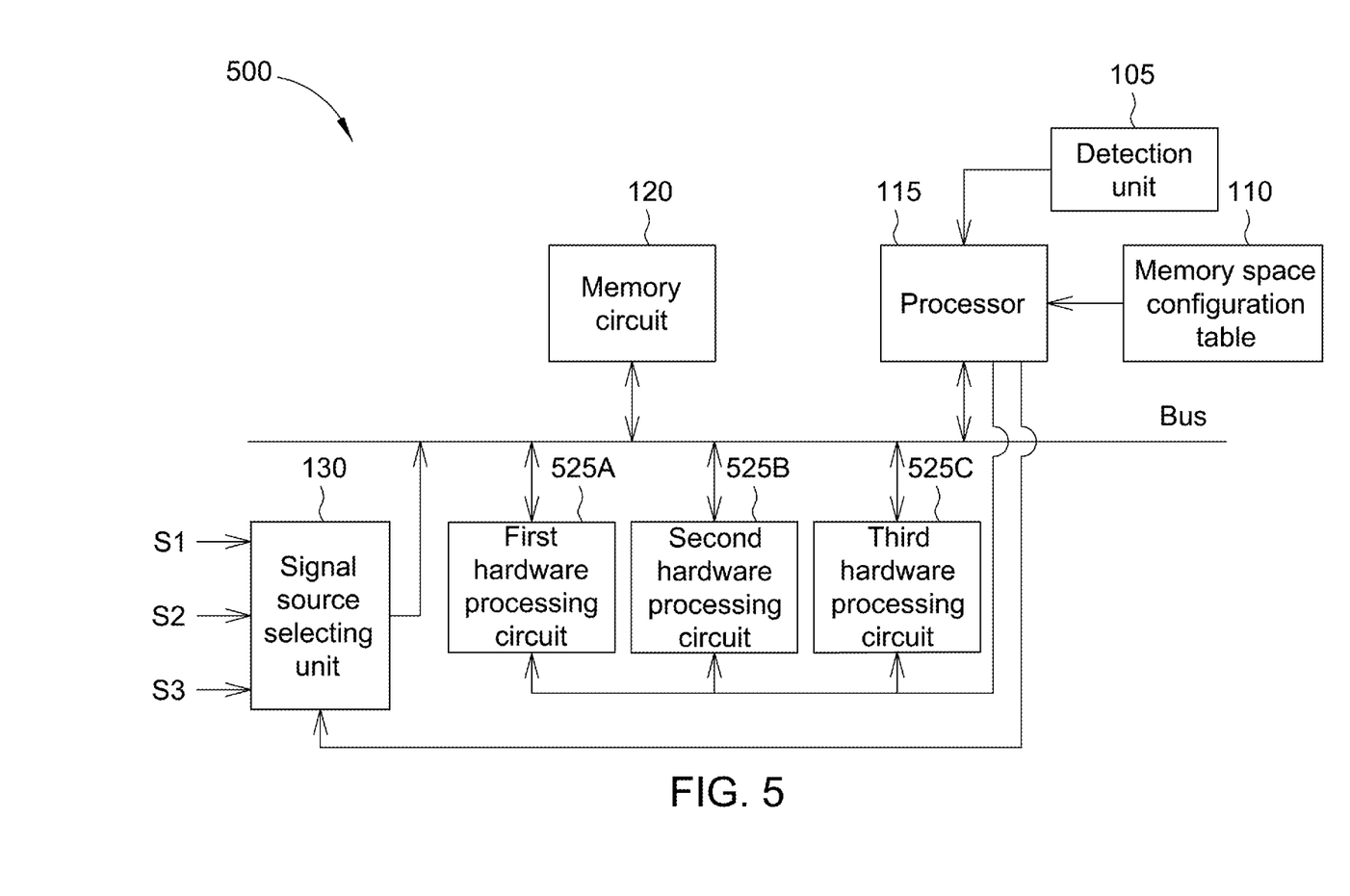
FIG. 5 is a schematic diagram of a video signal processing apparatus according to a second embodiment of the present invention.

In the present invention, the number of hardware circuit elements included in the video signal processing apparatus is not limited to a predetermined number. In response to current numerous types of signals that can received by the video signal processing apparatus, the video signal processing apparatus according to an embodiment of the present invention may also receive and process multiple (two or more) types of signal sources, and thus includes multiple different hardware circuit processing elements. FIG. 5 shows a schematic diagram of a video signal processing apparatus 500 according to a second embodiment of the present invention. The video signal processing apparatus 500 includes a detection unit 105, a memory space configuration table 110, a processor 115, a memory circuit 120, multiple hardware processing circuit elements 525A, 525B, and 525C, and a signal source selecting unit 130. The hardware processing circuit elements 525A, 525B, and 525C are for processing first, second, and third signal sources S1, S2, and S3, respectively. The first, second, and third signal sources S1, S2, and S3 are different. For example, the first signal source S1 is an analog television signal source, and the first hardware processing circuit 525A is a comb filter; the second signal source S2 is a digital television signal source, and the second hardware processing circuit 525B is a hardware processing circuit element for processing an EPG; the third signal source S3 is a multimedia signal source, and the third hardware processing circuit 525C is a hardware processing circuit element for processing multimedia data. Operations and functions of other circuit elements are the same as those in the foregoing descriptions, and shall be omitted herein for the sake of brevity.

Figure 6:
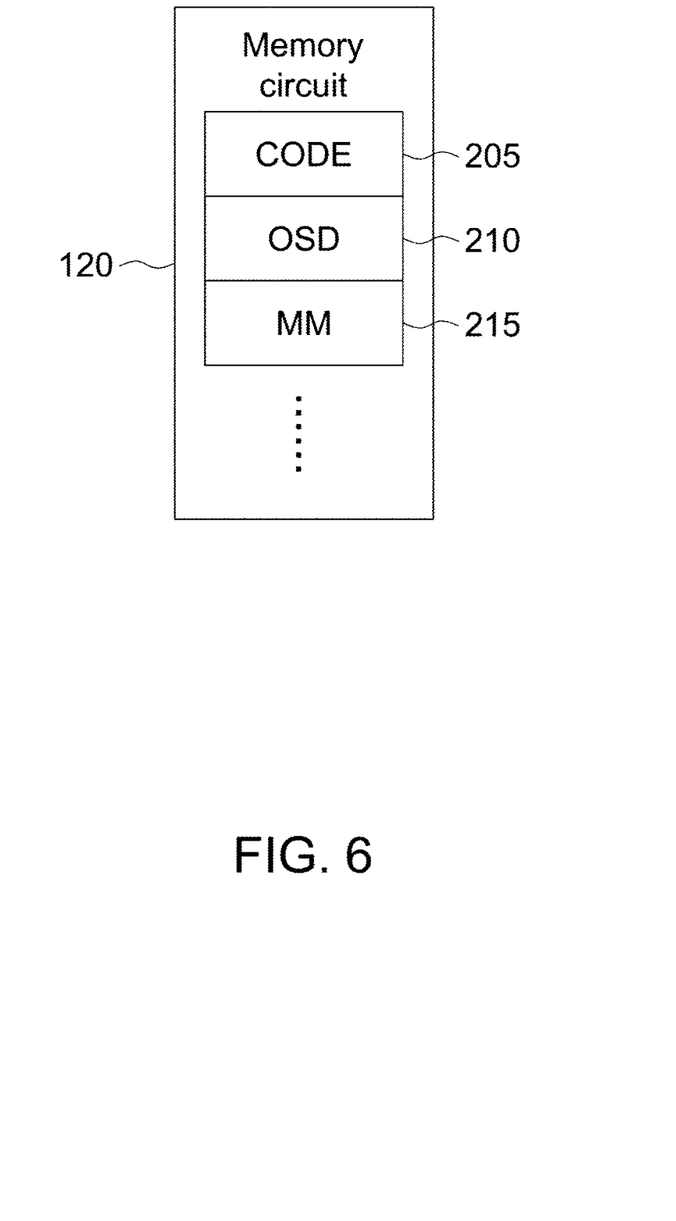
FIG. 6 is a schematic diagram of a memory space configuration of a memory circuit that the memory space configuration table in FIG. 5 designates for a multimedia signal source.

The memory space configuration of the memory circuit 120 is depicted in FIGS. 2A, 2B, and 6. FIGS. 2A, 2B, and 6 show memory space configuration methods of the memory circuit 120 that the memory space configuration table 110 in FIG. 5 designates for an analog television signal source, a digital television signal source and a multimedia signal source. As shown in the diagrams, the addresses of the memory spaces 205 and 210 are arranged for storing the processor code "CODE" and the OSD data "OSD" that are constantly accessed when processing the different signal sources S1, S2, and S3. When the video signal processing apparatus 500 is for processing an analog television signal source (as shown in FIG. 2A), the addresses of the memory space 215 are for storing signal data "COMB" for separating luminance and color signals from the analog television signal source. In contrast, when the video signal processing apparatus 500 is for processing a digital television signal source (as shown in FIG. 2B), the addresses of the memory space 215 are for storing EPG data and images "EPG" of the digital television signal source. Further, when the video signal processing apparatus 500 is for processing a multimedia signal source (as shown in FIG. 6), the addresses of the memory space 215 are for storing multimedia data and images "MM" of the multimedia signal source. Through storing different data (the data "COMB", "EPG", and "MM") when processing the different signal sources S1, S2, and S3 by using the same memory space 215 at different time points, the circuit design of the memory circuit 120 need not be implemented by a large memory space. In other words, the size of the memory circuit 120 can be relatively reduced for lowered production costs.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory space configuration method, applied in a video signal processing apparatus, comprising:
   arranging a first memory space and a second memory space in a memory, the first and second memory spaces being partially overlapped;
   selecting a signal source from a plurality of signal sources;
   when the selected signal source is a first video signal source, enabling a first processing circuit and buffering data associated with the first video signal source by using the first memory space; and
   when the selected signal source is a second video signal source, enabling a second processing circuit and buffering data associated with the second video signal source by using the second memory space;
   wherein, the second processing circuit is disabled when the first processing circuit is enabled; the first processing circuit is disabled when the second processing circuit is enabled.

2. The memory space configuration method according to claim 1, wherein the first video signal source is one of a digital television signal source, an analog television signal source, and a multimedia signal source, and the second video signal source is another of the digital television signal source, the analog television signal source, and the multimedia signal source.

3. The memory space configuration method according to claim 1, wherein the step of arranging the first memory space and the second memory space in the memory comprises:

recording an arrangement result to a memory space configuration table.

4. The memory space configuration method according to claim 3, wherein the step of buffering the data associated with the first video signal source by using the first memory space comprises:

obtaining an address of the first memory space from the memory space configuration table, and buffering the data associated with the first video signal source to the first memory space.

5. The memory space configuration method according to claim 4, wherein the step of buffering the data associated with the second video signal source by using the second memory space comprises:

obtaining an address of the second memory space from the memory space configuration table, and buffering the data associated with the second video signal source to the second memory space.

6. The memory space configuration method according to claim 1, further comprising:

releasing the first memory space when the first processing circuit is disabled; and releasing the second memory space when the second processing circuit is disabled.

7. A video signal processing apparatus, comprising:

a memory, arranged with a first memory space and a second memory space, the first and second memory spaces being partially overlapped;

a detection unit, for detecting a user command to select a signal source from a plurality of signal sources;

a first processing circuit, for processing a first video signal source;

a second processing circuit, for processing a second video signal source; and a processor, for controlling the first processing circuit and the second processing circuit according to the type of the selected signal source, enabling the first processing circuit to process the first video signal source by using the first memory space when the selected signal source is the first video signal source, and enabling the second processing circuit to process the second video signal source by using the second memory space when the selected signal source is the second video signal source.

8. The video signal processing apparatus according to claim 7, wherein the processor disables the second processing circuit when enabling the first processing circuit, and disables the first processing circuit when enabling the second processing circuit.

9. The video signal processing apparatus according to claim 8, wherein the first video signal source is one of a digital television signal source, an analog television signal source and a multimedia signal source, and the second video signal source is another of the digital television signal source, the analog television signal source and the multimedia signal source.

10. The video signal processing apparatus according to claim 8, further comprising:

a memory space configuration table, for recording configurations of the first and second memory spaces.

11. The video signal processing apparatus according to claim 10, wherein the processor obtains an address of the first memory space from the memory space configuration table, and buffers the data associated with the first video signal source to the first memory space; and obtains an address of the second memory space from the memory space configuration table, and buffers the data associated with the second video signal source to the second memory space.

12. The video signal processing apparatus according to claim 9, wherein the processor releases the first memory space when disabling the first processing circuit, and releases the second memory space when disabling the second processing circuit.

* * * * *